United States Patent [19]
Wedler

[11] Patent Number: 5,299,609
[45] Date of Patent: Apr. 5, 1994

[54] PRECISION ADJUSTABLE ROUTER FENCE

[76] Inventor: Richard L. Wedler, 16,650 Pineridge Dr., Granada Hills, Calif. 91344

[21] Appl. No.: 118,604

[22] Filed: Sep. 10, 1993

[51] Int. Cl.$^5$ ............................................. B27C 5/10
[52] U.S. Cl. ...................................... 144/1 F; 33/613; 33/628; 33/813; 83/522.15; 83/522.24; 144/134 D; 144/136 C
[58] Field of Search .............. 409/182; 144/1 E, 1 F, 144/134 R, 134 D, 136 R, 136 C, 137, 371; 83/522.15, 522.24, 574; 33/501, 613, 628, 813

[56] References Cited

U.S. PATENT DOCUMENTS

| | | | |
|---|---|---|---|
| 3,376,787 | 4/1968 | Morganson | 144/136 C |
| 3,478,788 | 11/1969 | Zelik | 144/134 D |
| 3,635,268 | 1/1972 | Lange | 144/136 C |
| 4,312,391 | 1/1982 | Snow | 144/1 F |
| 4,718,468 | 1/1988 | Cowman | 144/136 C |
| 4,911,214 | 3/1990 | Scott | 144/136 C |
| 4,913,206 | 4/1990 | Altinbasak | 144/136 C |
| 5,038,841 | 8/1991 | Larmon | 144/136 C |
| 5,080,152 | 1/1992 | Collins et al. | 144/136 C |

Primary Examiner—W. Donald Bray
Attorney, Agent, or Firm—J. E. McTaggart

[57] ABSTRACT

A positioning device is disclosed that positions and guides a nominally hand-held router or other machine tool for machining with respect to a workpiece that is used as a reference. A novel configuration is employed in which a main body holds a centrally located lead screw and attached micrometer dial. Two guide shafts are disposed flanking the lead screw. A transversely disposed yoke bar spans the lead screw and both guide shafts; these can each be locked in place by knurled thumscrews threaded into the yoke bar. A vernier adjustment knob rotating the lead screw drives the yoke bar and provides fine position adjustment that is both accurate and repeatable, and which can be locked by a knurled thumbscrew threaded into the yoke bar. The guide shafts accept the coarse adjustment by sliding through the yoke bar, where they can be locked in place by a pair of knurled thumbscrews threaded into the yoke bar to retain the coarse adjustment. The guide shafts return back upon and pass through the main body producing two novel features: firstly a novel folded or looped arrangement greatly simplifies and strengthens the mechanical configuration, and secondly the adjusting elements are entirely separated from the router or machine tool by the intervening main body.

20 Claims, 5 Drawing Sheets

PRECISION ADJUSTABLE ROUTER FENCE

FIELD OF THE INVENTION

The present invention relates to portable power tools and more particularly it relates to an improved adjustable fence for positioning and guiding the cutting tool of a router or other portable machining tool with respect to a workpiece.

BACKGROUND OF THE INVENTION

In routers and other portable power machine tools it is common practice to guide the cutting operation from an existing edge or surface of the workpiece to provide a basic reference. The machine tool generally utilizes a rotational cutting tool at the lower end of a vertical shaft. The cutting tool is positioned with respect to the reference by engaging the reference with some kind of matching element, plane, or surface attached to an adjustable positioning device known as a fence. The fence displaces the cutting tool with respect to the reference through an adjustment mechanism so that the desired cutting operation employing the cutting tool can be properly located and guided.

Adjusting the position of the cutting tool relative to the workpiece is a continuing problem, particularly in custom woodworking where high precision calibrated readjustment is often required; furthermore the fence must be convenient to adjust and, once adjusted, it must provide a very rugged structure for uniformity of the routing operation.

It is common for routers to be provided with adjustment capability and indication with regard to vertical settings of the cutting tool to vary the depth of cut; however similar capability is generally lacking with regard to adjustments in the horizontal plane, i.e. setting and readjusting the fence displacement.

RELATED PRIOR ART

Much prior effort has been expended in this technical area, but previous work has not produced the desired combination of results to the degree and in the fashion of this invention.

Both coarse and fine adjustment means for router fences have been disclosed as for example in U.S. Pat. Nos. 3,478,788 to Zelik and 7,718,468 to Cowman. Cowman further discloses specialized matching surfaces associated with the positioning device itself to accommodate a variety of workpiece shapes. It is noted that Cowman and Zelik typify a common asymmetrical structure characteristic of prior art wherein a pair of parallel support rods, attached to the router, are located offset from the cutting tool and on opposite sides thereof, and some form of manual adjusting mechanism such as a vernier screw with a clamping element is applied on one of the rods while the other rod runs through a sleeve that is attached to the fence and carries a second clamping element. In such asymmetrical structure, for either coarse or vernier readjustment it is necessary to first release both clamping elements, and since the mechanism acts in an offset manner on only one of the rods, proper adjustment action will be realized only if the opposite rod is able to slide freely through its retaining sleeve, otherwise any drag or binding on the second rod would tend to skew the fence base, interfere with the adjustment, and possibly stress the structure to a point of deformation. Following adjustment both of the two clamping elements must be re-engaged.

OBJECTS OF THE INVENTION

The primary object of this invention is to produce an adjustable fence having an improved structure for precisely setting and readjusting the location of the cutting tool of a router or other hand-held machining tool with respect to a workpiece.

It is a further object to provide in the improved fence structure, an adjustment mechanism, including a micrometer vernier adjustor, that acts symmetrically on both of a pair of guide shafts attached to the router.

It is a still further object in the improved fence structure to provide a vernier fence adjustment structure and mechanism that can be locked by a single clamping element.

SUMMARY OF THE INVENTION

The above objects and other advantages and benefits have been accomplished in the improved fence of the present invention that provides a micrometer-indicated threaded vernier adjustment mechanism that can be clamped with a single knurled thumbscrew. A symmetrically disposed lead screw acts in a balanced manner in line with the cutting tool via a yoke bar and a flanking pair of parallel guide shafts that pass through the yoke bar where they are slidable for course adjustment and can be clamped by a pair of knurled thumbscrews provided to retain the coarse adjustment setting. A pin bar attached at one end of the guide shafts is fitted with a pair of mounting pins for attachment to a router.

A main body is the support frame for various elements of the disclosed device and provides several other important functions. A portion or element of the main body provides a means for engaging some edge or surface of the workpiece to be used as a reference for subsequent machining operations. This portion of the main body can take the form of two extended legs that define a slot, which allows close access for the actual cutting tool of the router or machine tool so that cutting can occur effectively inside the nominal envelope of the main body for machining the edge of the workpiece or other close portions of the workpiece. This portion of the main body with the extended legs can engage the workpiece directly for reference, or it can hold various secondary attachments that then engage the workpiece for various specialized machining tasks.

The mechanical order of the positioning elements can be conceived schematically as forming a linear chain or sequence as follows: (a) the main body, (b) the fine adjusting lead screw attached to the main body, (c) the yoke bar threadably attached to the fine adjusting lead screw, (d) the two guide shafts passing through but clampable to the yoke bar to allow for the coarse adjustment, (e) a mounting pin bar containing mounting pins, and (f) the machine tool itself attached to the mounting pins. The guide shafts, however, pass freely back through the main body. Thus, the chain of positioning elements folds or loops back upon itself. Actually, a pair of loops is formed. Each guide shaft returns back through the main body with each retaining the combined fine and coarse adjustment. The use of this loop feature results in substantially improved mechanical compactness and stability. In spite of this folded configuration, however, the linear order of the positioning elements remains as first described. A further result of the folded configuration is the physical separation of the positioning elements from the machine tool through the interposition of a portion of the main body.

This novel folding or looping of the chain of positioning elements does not occur in the prior art. As mentioned above, in the prior art such positioning elements in effect are arranged in a straight line or sequence that is interposed between the machine tool and the frame of the body and are unbalanced because adjustment is introduced upon only one guide shaft or rod.

This invention achieves accurate and repeatable positioning of a nominally hand-held machine tool such as a router. Positioning such a tool repeatably with respect to the workpiece to within 0.001 inch (0.025 mm) is easily obtained through the use of the lead screw and the micrometer dial. Substantial time for set up and operation can be saved and costly mistakes can be eliminated by employing this simple but effective device.

The novel configuration of this invention with its balanced micrometer drive and looped positioning arrangement plus the physical separation of the adjusting elements from the tool support adds greatly to the overall performance improvement over typical prior art devices.

DETAILED DESCRIPTION

Figure 1:
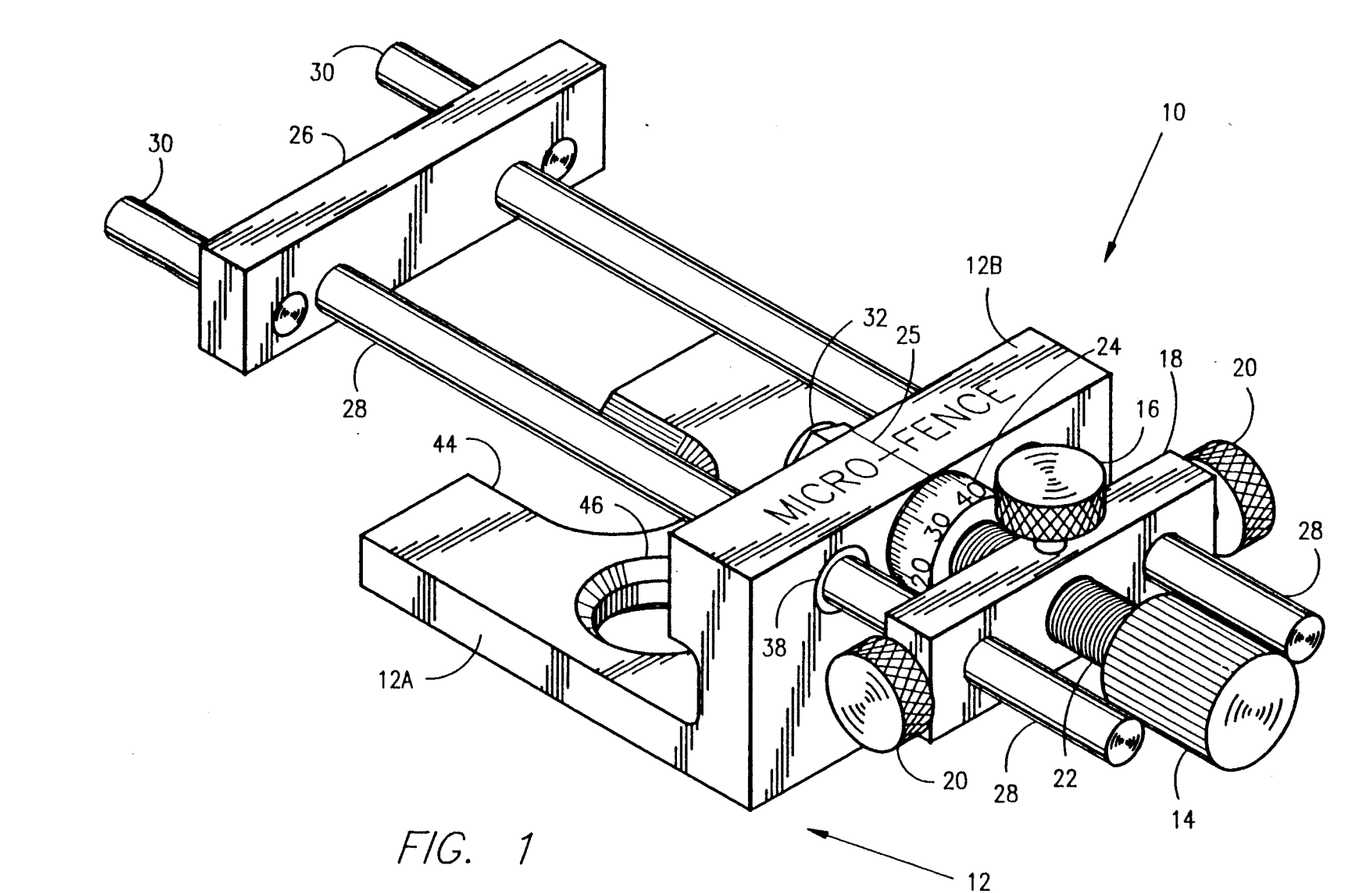
FIG. 1 is a perspective view of a router fence of the present invention.

In FIG. 1 a three dimensional view illustrates essential elements of the preferred embodiment 10 of the present invention. A main body 12 has a baseplate portion 12A and an upwardly extending flange block 12B that supports several other elements necessary for proper operation. A first end of lead screw 22 has a cylindrical portion passing through flange block 12B. A locknut 32 and a micrometer dial 24 secured to the lead screw 22 on opposite sides of flange block 12B form a thrust bearing which constrains lead screw 22 axially while allowing rotation. A cursor mark 25 gages the rotational position of micrometer dial 24. Lead screw 22 passes through a yoke bar 18 via a mating threaded hole, and has affixed at its second end a ribbed adjustment knob 14 for manual vernier adjustment by which the yoke bar 18 can be adjusted relative to the main body 12. Rotation of knob 14 turns both lead screw 22 and micrometer dial 24, and displaces the yoke bar 18.

On either side of the lead screw, a pair of guide shafts 28 pass through yoke bar 18 and flange block 12. Yoke bar 18 can be clamped to guide shafts 28 using clamping thumbscrews 20. Attached at the end of guide shafts 28 is pin bar 26 to which are attached a pair of mounting pins 30; these are general purpose elements intended to hold the router or other machine tool. Thus coarse adjustment can be made by sliding the yoke bar 18 along the guide shafts 28 and clamping it at the desired setting with thumbscrews 20.

Figure 2:
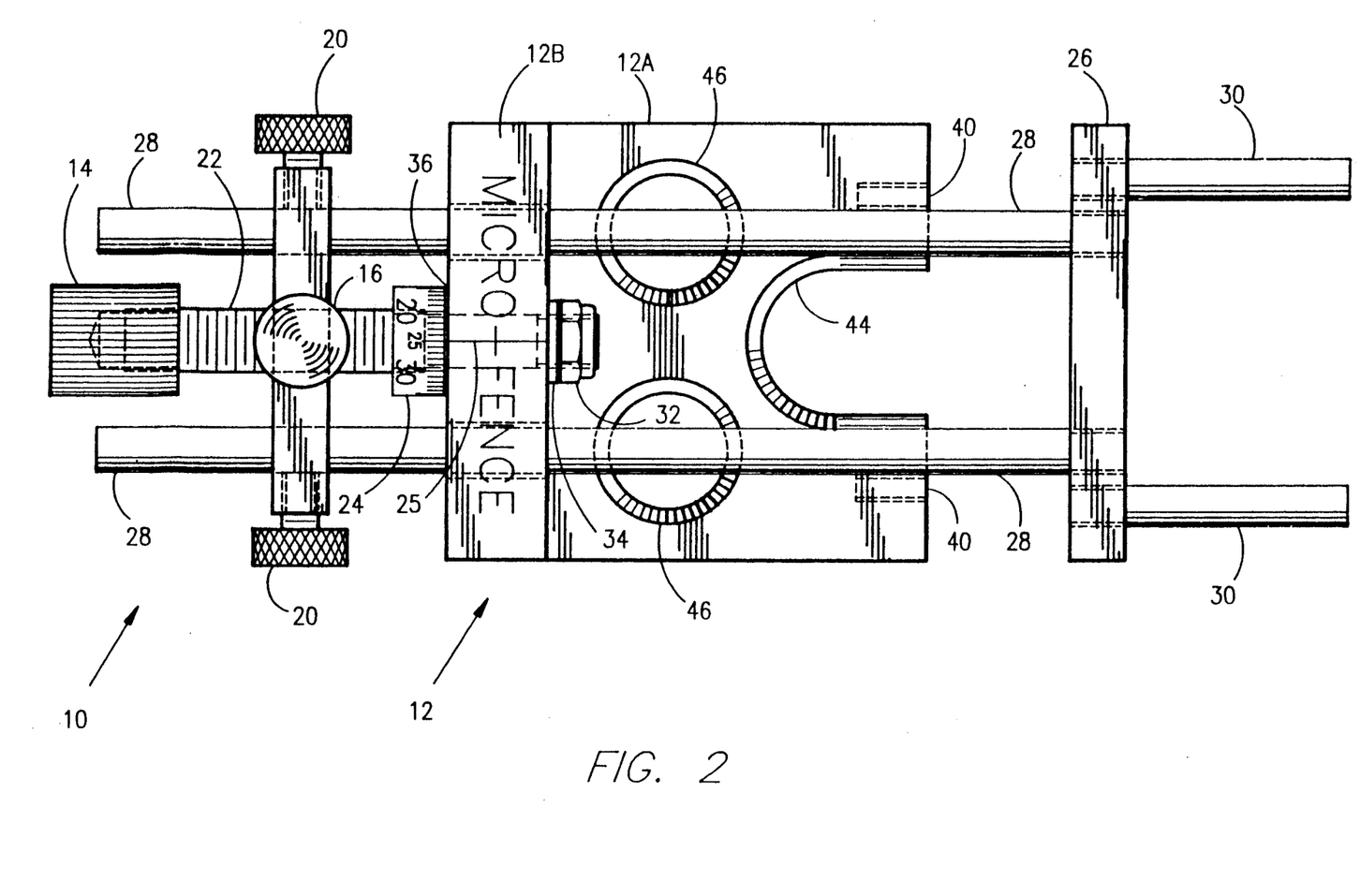
FIG. 2 is a top view of the router fence of FIG. 1.

FIG. 2 shows a plan view of the router fence of FIG. 1 and provides additional detail of some elements of this device. Plastic thrust washer 36 smooths the action of micrometer dial 24 as it rotates against flange block 12B of the flange block 12B, while locknut 32 constrains the end of lead screw 22 axially. Metal washer 34 buffers the thrust bearing action of locknut 32.

Edge 44 outlines a central U-shaped slot that permits the machine tool to be moved to a position that allows some cutting operations to proceed upon the same edge of the workpiece that provides the basic guiding reference.

Edges 46 outline two holes that allow for chip removal and in addition reduce the weight of the main body. Tapped holes 40 are used to hold various secondary attachments for specialized operations including pad accessories 48 for curvilinear work.

Guide shafts 28 and mounting pins 30 are seen threadedly attached to pin bar 26.

Figure 3:
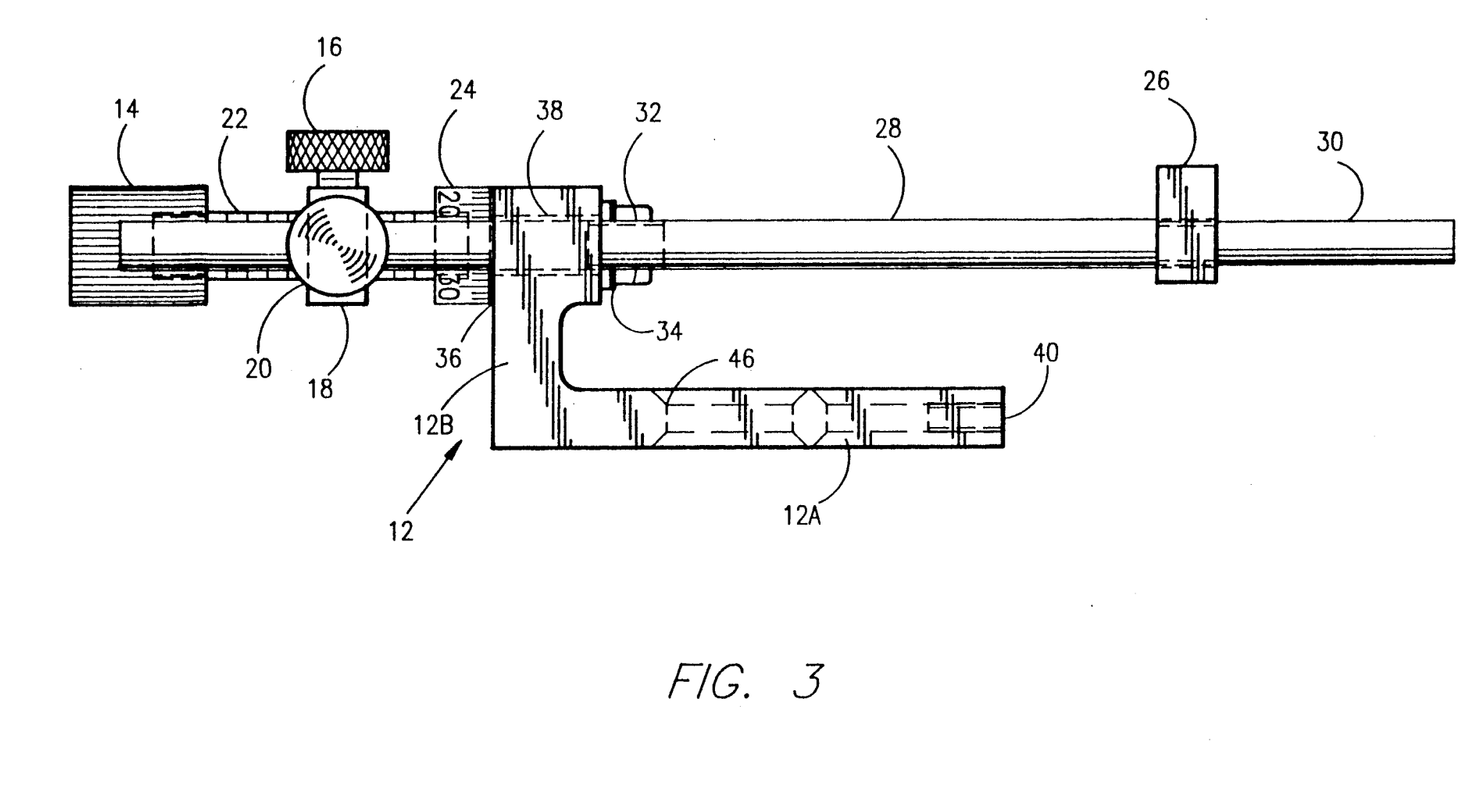
FIG. 3 is an elevation view of one embodiment of the the router fence of FIG. 1.

FIG. 3 is an elevation view of the router fence of FIG. 1, according to the present invention, and shows additional detail of the elements of the invention. Bearing sleeves 38 in the main body allow the guide shafts 28 to move smoothly and precisely through the flange block 12B.

Figure 4:
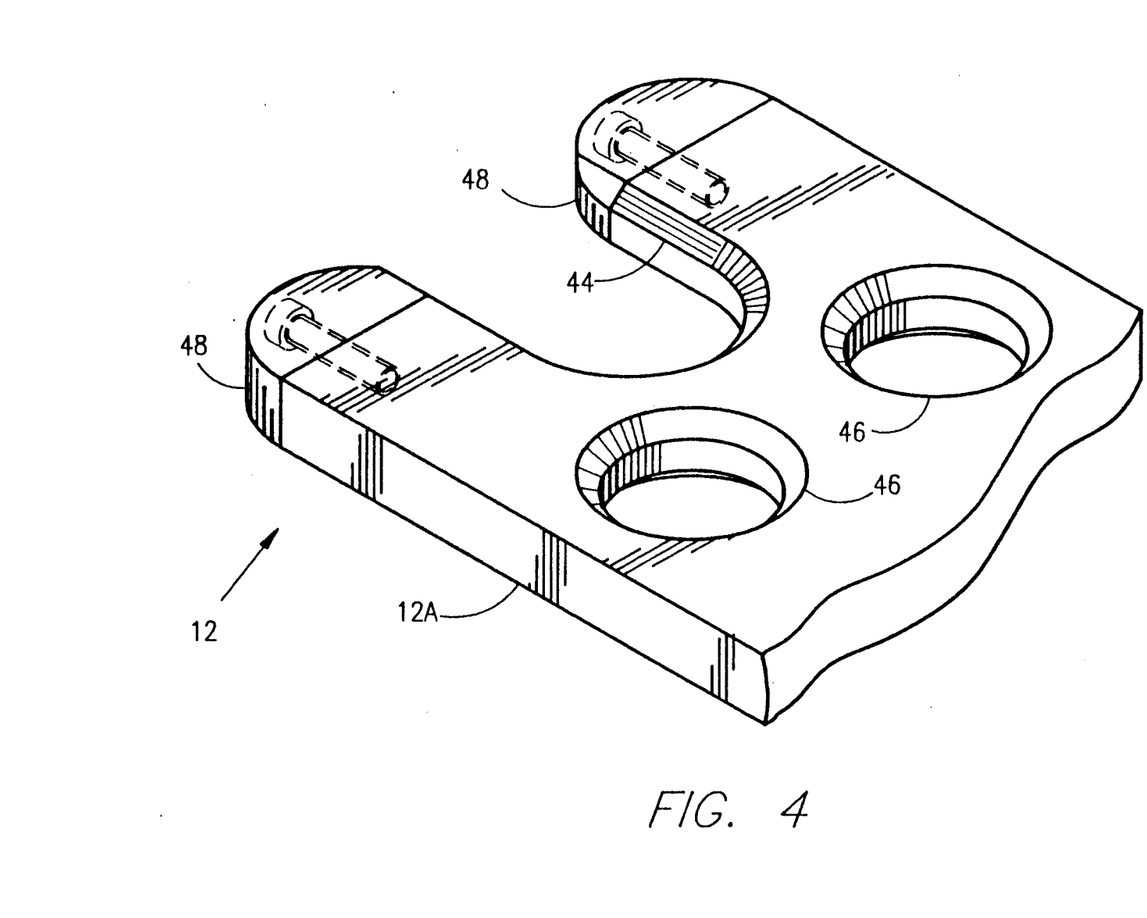
FIG. 4 is a perspective view of a portion of the main body of the router of FIG. 1, showing an attached accessory for curvilinear work.

FIG. 4 is a three dimensional view of a detail of the main body 12. Illustrated are semicircular pad accessories 48 attached to outwardly-facing mounting faces of the baseplate portion 12A of the main body 12 for use with curvilinear work. With the curved edge or other surface of the workpiece serving as the reference, the router or machine tool will be guided properly with respect to that reference edge. As mentioned above, the slot or U-shaped cutaway region outlined by edge 44 is defined by and lies between two extensions or legs of the baseplate portion 12A of the main body 12 that also contain threaded holes 40 (FIG. 3) to mount the secondary attachments mentioned above. A second attachment is a long straight element that serves as a guide for simple routing. The two large holes 46 in the main body reduce weight and facilitate the removal of chips.

Referring once again to FIG. 1, with regard to operation of the improved fence 10 of the present invention, the coarse position adjustment for the router or other hand-held machine tool is first introduced by sliding the guide shafts 28 through the flange block 12B and the yoke bar 18 to approximately the desired location. This coarse position is then held or retained by tightening thumbscrews 20 in the transversely disposed yoke bar 18 that spans the guide shafts 28. Thus each guide shaft 28 retains in coordinated fashion the coarse adjustment set at the yoke bar 18. Centrally located between the guide shafts 28, the threaded lead screw 22 engages the matching threaded hole in the transversely disposed yoke bar 18 and bears back upon flange block 12B of the main body 12 by thrust bearing action of micrometer dial 24 and locknut 32. The lead screw 22 is separate from the guide shafts 28 which constitute the primary set of ways.

The fine adjustment is achieved by turning the lead screw 22 by knob 14 and noting the reading on the micrometer dial 24. The micrometer dial 24, attached to the lead screw 22, displays the rotational position of lead screw 24 corresponding to small increments of displacement. This dial is particularly useful in that it provides the ability to set and reset the fine adjustment with great accuracy and repeatability, which aids the operator in achieving the desired location for final cutting. This fine adjustment moves the machine tool by way of the guide shafts 28 to the final desired location, which is then clamped in place by tightening thumbscrew 16 in the yoke bar 18 to bear against the lead screw 22. The novel central location of the lead screw 22 between the guide shafts 28 for the fine adjustment is important for a positioning drive that is both balanced and sturdy. The fine adjustment thus is applied directly through both guide shafts 28. It is typical in the prior art to introduce the fine adjustment in an unbalanced manner on but one element corresponding to only one of the present guide shafts.

Yoke bar 18 provides the essential connection between the fine and coarse position adjustments and is the means for folding the chain of positioning elements or correspondingly the sequence of positioning effort. With reference to FIG. 1, consider that positioning effort begins at main body 12 with the flange block 12B acting on micrometer dial 24 and/or locknut 32 as a thrust bearing, and then proceeds along lead screw 22 toward the right until yoke bar 18 is reached. Yoke bar 18 is disposed transversely spanning both guide shafts 28 and lead screw 22. At yoke bar 18, the positioning effort then transfers laterally to each of the guide shafts 28. At each guide shaft 28, the positioning effort reverses direction and then proceeds to the left through the guide shafts 28. The positioning effort then passes back through the main body 12 all the way to the pin bar 22 at the left end of the guide shafts 28, thence to the machine tool.

The small total number of parts making up the disclosed device contrasts significantly with the prior art and testifies to the novelty of the mechanical configuration. Another important feature is the separation of the adjusting elements from the tool support. It is of note that all adjusting elements lie on one side of flange block 12B. On the other side of the flange block 12B only pin bar 26 is located. Thus, a relatively short distance separates the router or machine tool from its support at flange block 12B. The resulting short cantilever support for the router or machine tool contributes to mechanical ruggedness and stability.

Figure 5:
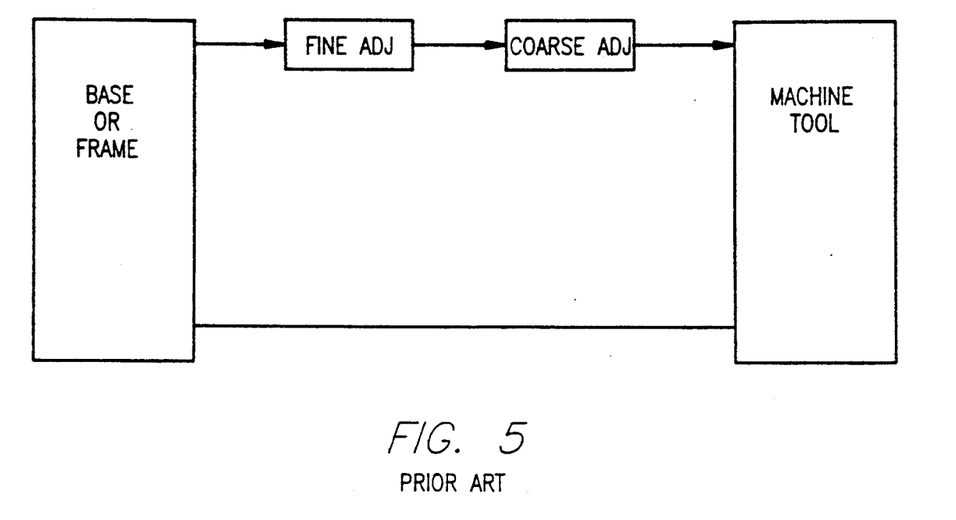
FIG. 5 is a schematic diagram illustrating an asymmetrical adjustment system as typically practiced in router fences of prior art.

FIG. 5 shows two schematic diagrams comparing the manner in which position adjustments are made typically in the prior art. The fine and coarse adjustments typically are introduced on only one of the guide shafts located between the workpiece and the machine tool. The mechanical configuration is schematically a linear chain proceeding from some kind of base or frame that engages the workpiece through the adjustments and finally to the machine tool. Further, because position adjustments typically are introduced on only one guide shaft, they are inherently unbalanced.

Figure 6:
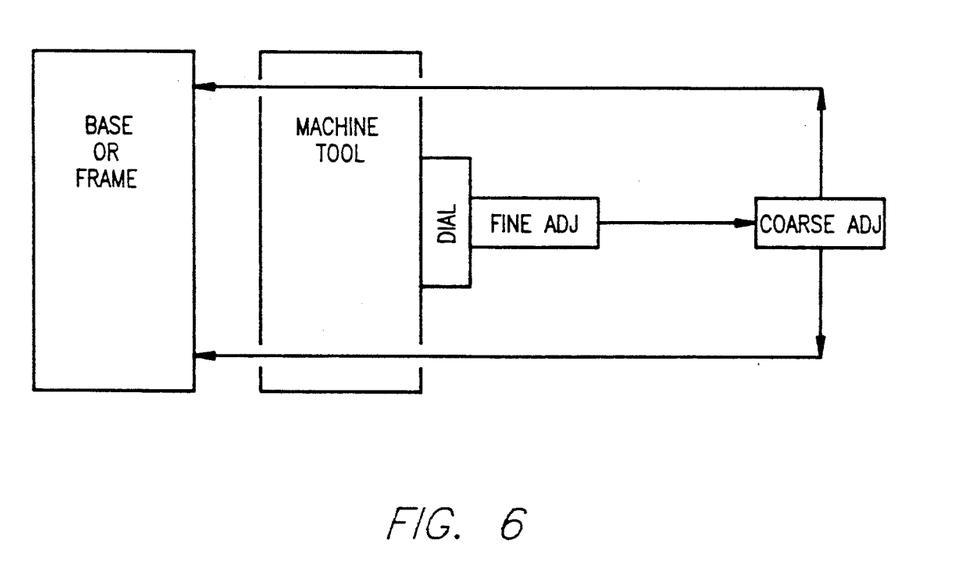
FIG. 6 is schematic diagram of the symmetrically balanced split-looped chain of positioning elements and mechanical adjustments of router fence of the present invention.

FIG. 6 is a schematic diagram, similar to that of FIG. 5, that applies to the present invention. Arrows shown indicate the direction of positioning effort. Beginning at the main body that engages the workpiece, the sequence of positioning effort proceeds through the centrally located lead screw with the micrometer dial attached for the fine position adjustment. Next, the coarse position adjustment follows in the sequence. At this point the positioning operation splits into two loops and is folded in balanced fashion to the two guide shafts that pass back through the main body and then on to the machine tool. Note that all adjusting elements lie to the right of the main body while only the machine tool lies to the left. In actual practice the coarse adjustment is performed before the fine adjustment, but the physical locations remain as indicated and do rot affect the logic of this comparison with the prior art.

Referring once again to FIG. 1, with regard to construction of the preferred embodiment of the present invention, typically, main body 12, yoke bar 18, and pin bar 26 are fabricated from anodized aluminum. Typically, lead screw 22 and guide shafts 28 are fabricated from stainless steel. Typically, knurled thumbscrews 16 and 20 are fabricated from brass. Typically, thrust washer 36, sleeves 38 and 42, and pad accessory 48 are fabricated from plastic materials.

In the preferred embodiment, two guide shafts 28 are utilized, symmetrically disposed on either side of the lead screw 22. These guide shafts 28 also serve to support the router or machine tool in the desired orientation with respect to the workpiece. As an alternative to utilizing two guide shafts 28, the fence of the present invention could be made with three or more guide shafts appropriately positioned.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A positioning device configured for locating and guiding an actual cutting tool for a portable machine tool such as a router with respect to a workpiece for the purpose of machining said workpiece, comprising:
   a main body having a substantially flat horizontal baseplate portion and an integral upwardly extending flange block;
   a lead screw having a first end rotatably engaged with the flange block;
   thrust means for constraining said lead screw axially relative to the flange block;
   a transverse yoke bar threadedly engaging said lead screw;
   a plurality of guide shafts, parallel to said lead screw, passing through corresponding apertures in said yoke bar in sliding engagement therewith;
   vernier adjustment clamping means for retaining vernier position adjustment settings of said lead screw relative to the flange block;
   coarse adjustment clamping means for retaining coarse position adjustment settings of said guide shafts relative to said yoke bar; and
   means for holding the machine tool, attached to each of said guide shafts.

2. The positioning device as defined in claim 1 wherein said thrust means comprise a first thrust collar and a second thrust collar attached to said lead screw and located on opposite sides of the flange block.

3. The positioning device as defined in claim 2 wherein one of said thrust collars constitutes a micrometer dial attached to said lead screw and having engraved markings that cooperate with a cursor mark provided on the flange block to provide micrometer readings of vernier adjustments.

4. The positioning device as defined in claim 2 wherein one of said thrust collars comprises a locknut threadedly attached to the first end of said lead screw.

5. The positioning device as defined in claim 1 further comprising a vernier adjustment knob for manual rotation attached to said lead screw at a second end thereof.

6. The positioning device as defined in claim 1 wherein:
said plurality of guide shafts comprises two guide shafts symmetrically disposed with respect to said lead screw in a horizontal plane and passing slidably through the flange block and through said yoke bar, and
said yoke bar is arranged transversely and spans said lead screw and both said guide shafts.

7. The positioning device as defined in Claim 3 wherein:
the flange block is disposed at a first edge of the baseplate region of said main body;
the baseplate portion and said means for holding the machine tool are located on a first side of the flange block; and
said yoke bar, said clamping means, the micrometer dial and said vernier adjustment knob are located on a second and opposite side of said flange block.

8. The positioning device as defined in Claim 7 wherein said vernier adjustment clamping means comprises a knurled thumbscrew threadedly engaged in said yoke bar so as to bear on said lead screw, and said coarse adjustment clamping means comprises a pair of knurled thumbscrews threadedly engaged in said yoke bar at opposite ends thereof so as to each bear on a corresponding one of said guide shafts.

9. The positioning device as defined in claim 7 wherein said means for holding the machine tool comprises a pin bar secured to each of said guide shafts and fitted with a pair of cylindrical pins for attachment to the machine tool.

10. The positioning device as defined in claim 1 wherein said main body is configured to have in the baseplate portion a U-shaped cutaway region extending inwardly from an edge of the baseplate portion opposite the flange block, for enhancing access of a rotating cutting tool of the machine tool to a workpiece.

11. The positioning device as defined in claim 10 wherein the baseplate portion is configured to provide a pair of flat outwardly-facing mounting faces flanking the U-shaped cutaway region and to provide in the baseplate portion, centrally located in each of the mounting faces, a threaded cylindrical aperture for mounting accessory guide members.

12. The positioning device as defined in claim 11 further comprising a pair of semicircular guide members each threadedly attached against a corresponding one of the mounting faces.

13. The positioning device as defined in claim 1 wherein:
said thrust means comprises a first thrust collar formed by a locknut threadedly attached to the first end of said lead screw and a second thrust collar, with engraved markings, constituting a micrometer dial that cooperates with a cursor mark provided on the flange block to provide micrometer readings of vernier adjustments, said first and second thrust collars being located on opposite sides of the flange block;
said plurality of guide shafts comprises two guide shafts symmetrically disposed with respect to said lead screw in a horizontal plane and passing slidably through the flange block and through said yoke bar;
said yoke bar is disposed transversely and horizontally, spanning said lead screw and both said guide shafts;
the flange block is disposed at a first edge of the baseplate portion of said main body;
said yoke bar, said clamping means and the micrometer dial are located on a first side of the flange block, and the baseplate portion of said main body and said means for holding the machine tool are located on a second and opposite side of the flange block;
said vernier adjustment clamping means comprises a knurled thumbscrew, threadedly engaged in a central region of said yoke bar so as to bear on said lead screw;
said coarse adjustment clamping means comprises a pair of knurled thumbscrews threadedly engaged in said yoke bar at opposite ends thereof so as to each bear on corresponding ones of said guide shafts;
said lead screw is fitted with an adjustment knob attached at a second end thereof;
the means for holding the machine tool comprises a pin bar secured to each of said guide shafts fitted with two cylindrical pins for attachment to the machine tool;
said main body is configured to have in the baseplate portion a U-shaped cutaway region extending inwardly from an edge of the baseplate portion opposite the flange block, for providing clearance around a rotating cutting tool of an associated router to enable close access to a workpiece; and
the baseplate portion is configured to provide a pair of flat outwardly-facing mounting faces flanking the U-shaped cutaway region and to provide in the baseplate portion, centrally located in each of the mounting faces, a threaded cylindrical aperture for mounting accessory guide members.

14. An adjustable fence for attachment to a router to provide guidance along a workpiece, comprising:
a main body configured with a horizontal baseplate portion having a vertically extending flange block, the flange block having (a) a first cylindrical bearing aperture running through a central region of the flange block and (b) a plurality of bearing apertures symmetrically flanking the first cylindrical aperture and disposed parallel thereto;
an elongated threaded lead screw having at a first end thereof a cylindrical bearing portion in rotatable engagement with the first cylindrical bearing aperture;
thrust means for constraining said lead screw axially relative to the flange block while allowing said lead screw to rotate;
an elongated yoke bar mounted transversely on the main threaded portion of said lead screw and threadedly engaged thereto by a threaded aperture traversing a central region of the yoke bar, said yoke bar being configured with a plurality of bearing apertures corresponding to and aligned with the bearing apertures in the flange block of the said main body;
a plurality of elongated guide shafts each traversing a corresponding one of the bearing apertures in the flange block and one of the bearing apertures in said yoke bar; a mounting pin bar secured transversely to said plurality of guide shafts at a first end thereof;

a pair of mounting pins, for attachment to a router, secured to said mounting pin bar;

vernier adjustment clamping means for manually clamping said lead screw against rotation in said yoke bar;

coarse adjustment clamping means for manually clamping said yoke bar against travel along said guide shafts; and a vernier adjustment knob secured to a second end of said lead screw.

15. The adjustable fence as defined in claim 14 wherein said thrust means comprises a locknut threadedly engaged on a first end of said lead screw so as to constitute a first collar, and a second collar, disposed on an opposite side of the flange block, provided with circumferential calibration markings so as to constitute a micrometer dial that provides, in cooperation with a cursor line marked on the flange block, micrometer readings relating to displacement of said mounting pins relative to said main body of the fence attachment.

16. The adjustable fence as defined in claim 14 wherein:

said plurality of guide shafts comprise two guide shafts disposed symmetrically flanking said lead screw in a common horizontal plane therewith;

said plurality of bearing sleeves in the flange block comprise two bearing sleeves therein; and said plurality of bearing apertures in said yoke bar comprise two bearing apertures therein.

17. The adjustable fence as defined in claim 16 wherein said coarse adjustment clamping means comprises a pair of knurled thumbscrews threadedly engaging said yoke bar at opposite ends thereof such that said guide shafts can be clamped in said yoke bar.

18. The adjustable fence as defined in Claim 14 wherein:

the flange block is disposed at a first edge of the baseplate portion of said main body;

the baseplate portion and said means for holding a machine tool are located on a first side of the flange block; and said yoke bar, said clamping means, the micrometer dial and said vernier adjustment knob are located on a second and opposite side of said flange block.

19. A positioning device, configured for locating and guiding an actual cutting tool for a nominally hand-held router or machine tool with respect to a workpiece for the purpose of machining said workpiece, said positioning device schematically constituting a chain of positioning elements comprising:

a main body;

a centrally located fine positioning adjustment;

a transversely arranged connecting element splitting positioning effort effectively into two segments on either side of said fine positioning element, each of the segments providing a coordinated coarse positioning adjustment; and a pair of positioning elements that retain coarse adjustment and reverse the direction of the positioning effort forming a pair of loops that transmit the combined fine and coarse adjustments back through the main body and on to the machine tool.

20. The positioning device as defined in Claim 19 wherein:

said fine positioning adjustment is a lead screw with a a micrometer dial and an adjusting knob attached thereto, said transversely arranged connecting element is a yoke bar, and each of said pair of positioning elements that retain the coarse adjustment is a guide shaft.

* * * * *